Figure 1:
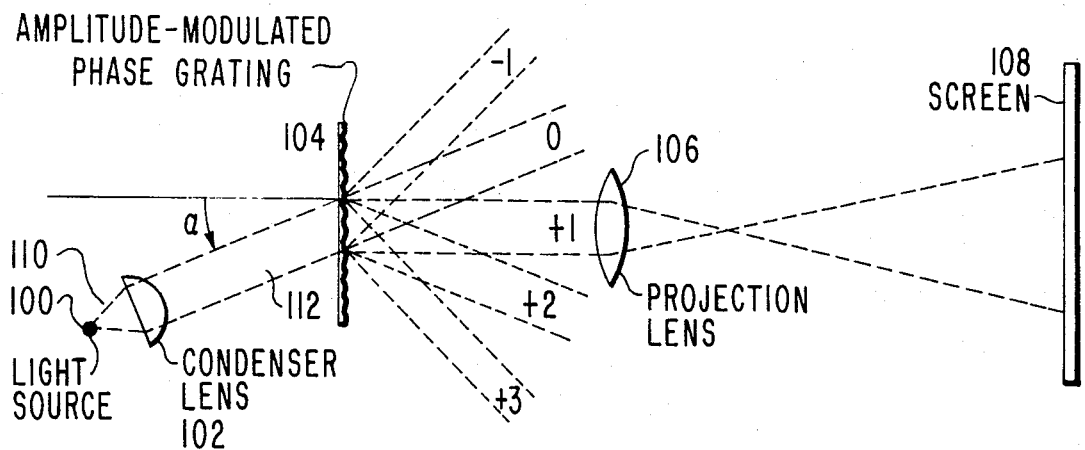

United States Patent

Knop

[11] 3,961,836
[45] June 8, 1976

[54] FOCUSED-IMAGE HOLOGRAM SYSTEM PROVIDING INCREASED OPTICAL READOUT EFFICIENCY

[75] Inventor: Karl Knop, Zurich, Switzerland

[73] Assignee: RCA Corporation, New York, N.Y.

[22] Filed: Sept. 20, 1974

[21] Appl. No.: 507,706

[52] U.S. Cl. .................................................. 350/3.5
[51] Int. Cl.² ........................................... G03H 1/22
[58] Field of Search ...................... 350/3.5, 162 SF

[56] References Cited
UNITED STATES PATENTS

| | | | |
|---|---|---|---|
| 3,743,507 | 7/1973 | Ih et al. | 50/3.5 |
| 3,754,808 | 8/1973 | Clay et al. | 350/3.5 |

Primary Examiner—Ronald J. Stern
Attorney, Agent, or Firm—Edward J. Norton; George J. Seligsohn

[57] ABSTRACT

A focused-image hologram recorded in a thin phase medium having a high-frequency line spacing, such that the ratio of this line spacing to the wavelength of the readout light beam is greater than one but less than two, when read out with a light beam inclined at an angle greater than 30° with respect to the normal to the plane of the focused image hologram, results in an optical readout efficiency approaching 50%, compared to the theoretical maximum optical readout efficiency of about 34% of a coarse sinusoidal phase grating having a line spacing much larger tha twice the wavelength of the readout light beam.

2 Claims, 4 Drawing Figures

FIRST ORDER DIFFRACTION EFFICIENCY OF HIGH-FREQUENCY GRATINGS

PRIOR ART

FOCUSED-IMAGE HOLOGRAM SYSTEM PROVIDING INCREASED OPTICAL READOUT EFFICIENCY

This invention relates to focused image holography and, more particularly, to a technique for increasing the optical efficiency with which a focused-image hologram may be read out. As is known, a hologram can be considered to be a recording of a spatial-carrier signal which is modulated with object information. Although not limited thereto, this object information usually manifests a given scene. In general, the object information need not be focused and the modulation of the spatial-carrier may consist of both amplitude and frequency modulation. Of these two forms of modulation, only frequency modulation alters the recorded spatial wavelength of the carrier in accordance with the object information.

A special case of a hologram is a focused-image hologram. In the recording of a focused-image hologram, the object information is focused in an image plane and the recording medium on which the hologram is to be recorded is situated at this image plane. As is known in the art, a first technique for recording a focused-image hologram is by the interference between a focused-image information beam of coherent light energy with an angularly-displaced reference beam of this coherent light energy. In this case, the spatial-carrier is manifested by a diffraction grating having a line-spacing determined solely by the wavelength of the coherent recording light and the angular-separation between the focused-image beam and the reference beam at each point of the recording. However, the amplitude of this recorded diffraction grating at each point thereof is determined by the focused-image information at that point.

Other techniques are known in the art for recording a focused-image hologram. A first of these other techniques involves exposing a recording medium, such as a photoresist, to two angularly-displaced unmodulated plane waves of coherent light and thereafter doubly exposing the recording medium with a focused image information beam of light which need not be coherent. After development of the recording medium, there results a diffraction grating having a given line spacing which is amplitude-modulated by the focused-image. In this case, the given line spacing is determined solely by the wavelength of the aforesaid coherent plane waves and the angular displacement between them.

In a second other technique for recording a focused-image hologram, disclosed in U.S. Pat. No. 3,743,507, a diffraction grating on a substrate material is covered by a positive photoresist and the photoresist is exposed to a focused image information beam of light which need not be coherent. After development, more or less of the underlying diffraction grating is revealed at each point thereof in accordance with the brightness of the focused image at that point. Again, the diffraction grating has a given line spacing which is independent of the information in the focused image, but the diffraction grating is amplitude modulated in accordance with the information in the focused image.

As is known in the art, a focused-image hologram recording may include only a single focused-image hologram to be read out in black-and-white or a single color, or it may include a plurality of superimposed focused image holograms, each of a different line spacing and/or angular orientation, to be read out in full color.

Reading out of a focused-image hologram is accomplished by illuminating the focused-image hologram with one or more readout beams of light. Each of these beams may be relatively monochromatic or may be relatively broad band, depending on the specific details of the readout system. In any case, each wavelength component of each beam gives rise to a plurality of diffraction orders consisting of a zero order and a plurality of higher orders, which occur in pairs as is known. Normally, the useful reconstructed holographic image is obtained solely from a single one of the first orders of diffraction. Thus, all of that part of the incident light in the readout beam which contributes to all the other diffraction orders, except the single first diffraction order which gives rise to the reconstructed image, is wasted.

It can be theoretically shown that the maximum first order optical diffraction efficiency, of a sinusoidal phase grating in the usual case where the given line spacing $d$ of the diffraction grating forming the focused-image hologram is very much larger than twice the wavelength $\lambda$ of the readout light beam ($d>>\lambda$), is only about 34%.

In the state of the art prior to the present invention, it is customary to record focused image holograms incorporating relatively coarse sinusoidal diffraction gratings (where this 34% maximum optical diffraction efficiency is exhibited, i.e., $d$ is many times more than twice as large as $\lambda$). In most focused-image hologram readers, the readout beam is incident on the focused-image hologram at an angle with respect to the normal to the plane of the focused-image hologram such that the cosecant of this angle is equal to the ratio of $d$ to $\lambda$. The reason for this, known in the art, is that under this condition, the desired one of the pair of first diffraction orders, from which the reconstructed image arises, emerges in a direction normal to the plane of the focused image hologram. In this case, if $d$ is many times more than twice as large as $\lambda$, the proper angle of incidence of the readout beam (which makes the cosecant of this angle equal to the ratio of $d$ to $\lambda$) is small relative to 30°.

It has been found that when the ratio of the diffraction grating line spacing $d$ of the focused image hologram to the wavelength $\lambda$ of the incident readout beam is made greater than one but less than two and the angle of incidence of the readout beam with respect to the normal to the focused image hologram is made greater tan 30°, first order diffraction optical efficiency obtained is greater than the theoretical maximum efficiency of 34% discussed above, of a thin sinusoidal phase grating.

Figure 1B:
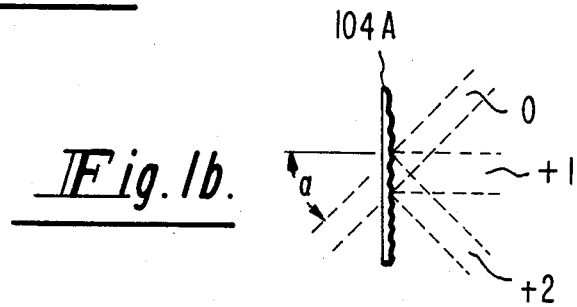
Figure 1A:
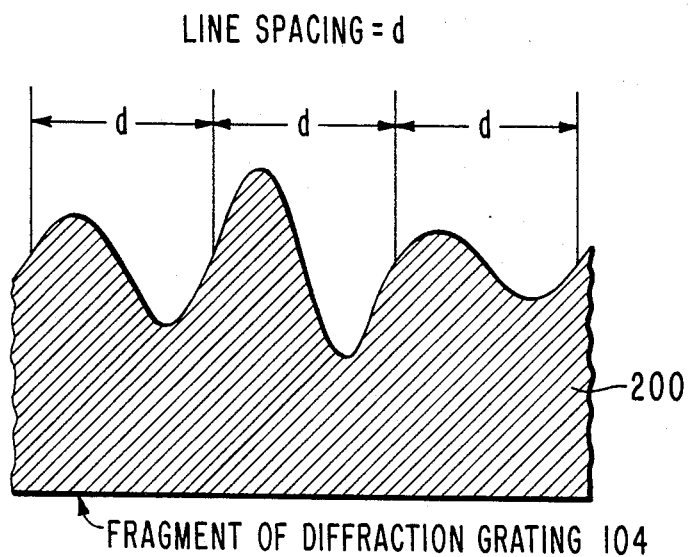
Figure 2:
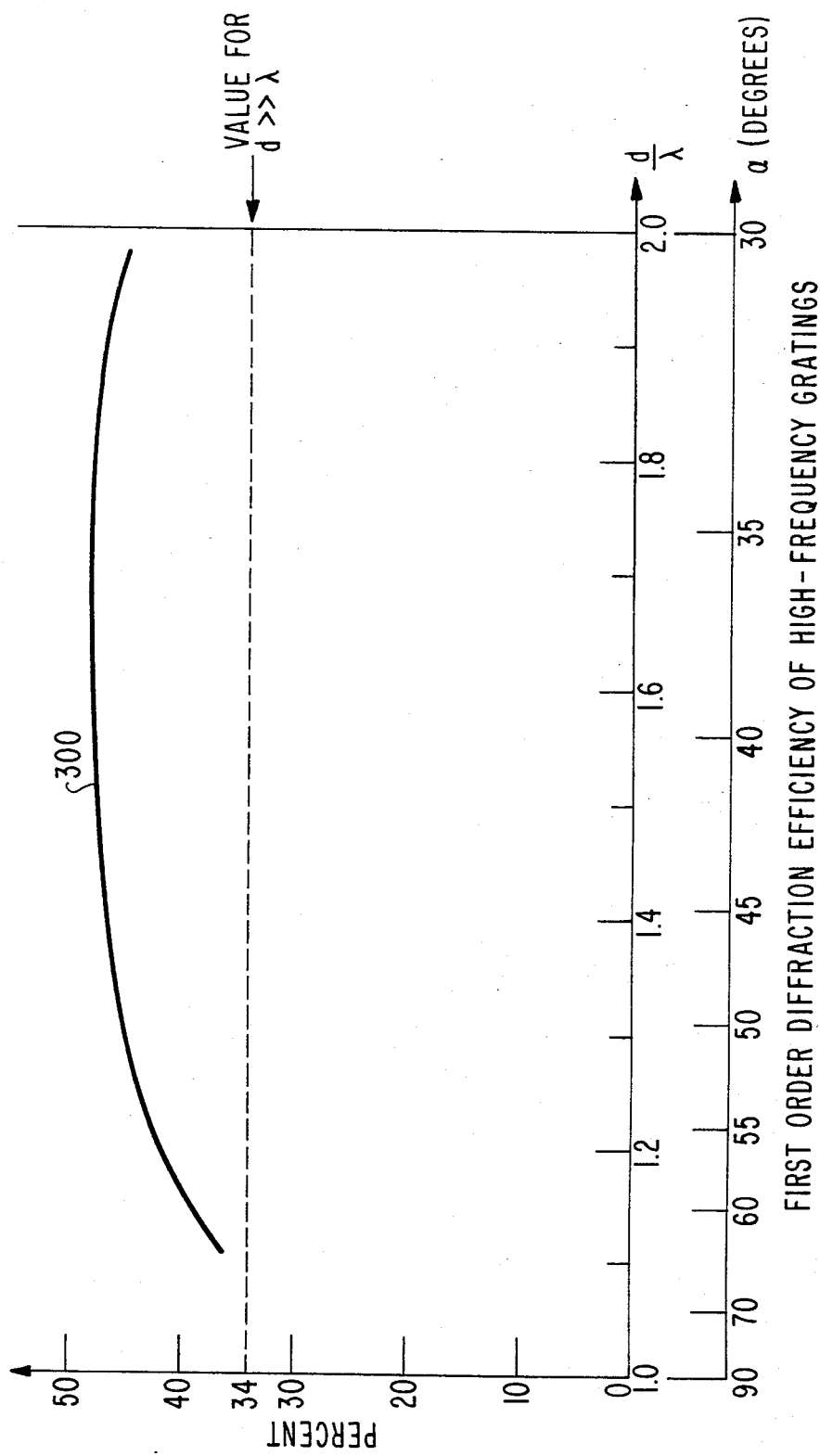

This and other features and advantages of the present invention will become more apparent from the following detailed description, taken together with the accompanying drawing, in which:

FIG. 1 illustrates a generalized embodiment of a reader for a prior-art "coarse" amplitude-modulated thin sinusoidal phase grating;

FIG. 1a illustrates a fragment of a typical thin sinusoidal phase grating of FIG. 1, revealing the material details thereof, FIG. 1b shows a modification of the reader of FIG. 1 employing a high-frequency grating ($1<d/\lambda<2$), and FIG. 2 is an experimental curve relating the first order diffraction efficiency of high-frequency grating ($1<d/\lambda<2$), which experimental curve illustrates the benefits of the present invention.

Referring now to FIG. 1, there is shown light source 100, condenser lens 102, amplitude-modulated focused-image diffraction grating 104, projection lens 106 and screen 108. Depending upon the specific type of focused-image hologram reader in which it is employed, light source 100 may be either a relatively monochromatic light source or a relatively broad-band (e.g. white) light source which emits light energy 110. Light energy 110 includes (at least as a component thereof) light at some predetermined wavelength $\lambda$. For purposes of teaching the principles of the present invention, it will be assumed that light energy 110 consists of the component at this predetermined wavelength $\lambda$. This simplifies the conventional optics required in the system compared to those required in various types of practical focused-image hologram readers, without detracting from the teaching of the present invention.

Specifically, such practical readers, depending upon the type, may employ more than one light source or may employ one or more optical elements arranged as beam splitters, or may include a spatial filter for separating diffraction orders and/or passing only certain wavelength components of broad band light which has been dispersed by the diffraction grating, etc. Since these conventional optical elements form no part of the invention and the detailed description thereof would only obscure the teaching of the present invention, they have not been shown in FIG. 1.

As shown in FIG. 1, condenser lens 102 transforms light 110 incident thereon into plane wave beam 112, which forms a readout beam illuminating the amplitude-modulated focused-image diffraction grating 102 at an angle $\alpha$ with respect to the normal to the plane in which amplitude-modulated phase grating 104 lies.

Although not limited thereto, focused-image diffraction grating 104 is preferably recorded either by interference of two coherent beams or by the "first other" technique (involving the double exposure of a photoresist) described above. FIG. 1a shows the details of an amplitude-modulated focused-image diffraction grating recorded by one of these preferred techniques. As shown in FIG. 1a, the thickness of the recording medium, which has an index of refraction different from its surroundings, varies from point to point in a sinusoidal manner to provide a diffraction grating with a fixed given line spacing $d$, which is independent of the information characteristics of the recorded focused image. However, as is also shown in FIG. 1a, the amplitude of the sinusoidal variations in thickness of recording medium 200 is not constant, but changes from point to point in accordance with the brightness information characteristics of the recorded focused image.

If the value of the angle $\alpha$ is selected, as is customary, so that the cosecant of $\alpha$ is equal to the ratio of d (the line spacing of amplitude-modulated focused-image diffraction grating 104), to $\lambda$ (the wavelength of the light in readout beam 112), the +1 diffraction order of the light wave emerging from diffraction grating 104 will be oriented in a direction normal to the plane of diffraction grating 104, as shown in FIG. 1. However, the light in other diffraction orders will emerge at oblique angles with respect to the plane of diffraction grating 104. The light in the +1 diffraction order is employed for projecting on screen 108, by means of projection lens 106, a reconstructed image of a given scene recorded on focused-image diffraction grating 104. However, all the light in the other diffraction order is wasted.

As is known in optics, the value of the angular separation between adjacent diffraction orders is substantially equal to the cosecant of the ratio of the diffraction grating line spacing $d$ to the wave energy wavelength $\lambda$, while the direction of the zero diffraction order is always in the direction of the incident readout beam of wave energy. Therefore, since the light wave energy in any diffraction order can substantially exist only on the output (right) side of diffraction grating 104, the number and selection of the diffraction orders which exist is determined by the line spacing $d$ of diffraction grating 104 and the angle of incidence $\alpha$ of readout information beam 112. For instance, FIG. 1 shows the arrangement of the diffraction orders when $\alpha$ is somewhat less than 30° ($\alpha \sim 23°$) and the ratio of the diffraction line spacing d to the wave energy wavelength $\lambda$ is somewhat greater than 2 ($d/\lambda = 2.56$). Under such conditions, the diffraction orders present will be the −1 diffraction order, the 0 diffraction order, the +1 diffraction order, the +2 diffraction order, and the +3 diffraction order, arranged as shown in FIG. 1. However, when diffraction grating 104 is an even coarser diffraction grating (which is the more usual case), d will be very much larger than twice $\lambda$. If, in this latter case, the cosecant of $\alpha$ is made equal to the ratio of $d$ to $\lambda$ of such a coarse diffraction grating, the light wave energy emerging from such a coarse diffraction grating will include many other diffraction orders in addition to the five specific diffraction orders shown in FIG. 1.

Regardless of the total number of diffraction orders, the wasted light energy is the total of all the light energy which exists in all the diffraction orders other than the desired +1 diffraction order. It can be shown theoretically that for such coarse sinusoidal phase gratings (those producing a number of diffraction orders equal or greater than the five shown in FIG. 1), this wasted light approaches 66% of the incident light energy regardless of the exact value of the ratio of $d$ to $\lambda$ and, hence, the total number of diffraction orders which occur. Thus, in the case of a coarse diffraction grating, the maximum theoretical optical efficiency is about 34%.

It has been found experimentally that this limit does not hold for relatively high-frequency diffraction gratings, in which the line spacing of the diffraction grating is greater than one but less than two, and the value of $\alpha$ is greater than 30°. (The cosecant of 30° is two.) In particular, when such a high-frequency diffraction grating 104A, shown in FIG. 1b, is substituted for grating 104 of FIG. 1, and $\alpha$ is made greater than 30°, only three diffraction orders (the zero, +1 and +2 diffraction orders) are derived. FIG. 2 provides an experimental curve showing that efficiencies greater than 34% and approaching 50% were obtained for such high-frequency diffraction gratings. This is explained by the fact, that under these conditions only the zero, the +1 and +2 orders are present.

In FIG. 2, curve 300 shows the maximum efficiency obtainable for different values of the ratio $d$ for $\lambda$. That is, for each different value of the ratio $d$ to $\lambda$ within the experimental range between 1 and 2 and to cosecant of $\alpha$ being adjusted to this ratio, it was found that the measured diffraction efficiency was a function of the amplitude of the diffraction grating. Curve 300 was obtained by using those particular amplitudes at each measured ratio of $d$ to $\lambda$ which resulted in the highest optical diffraction efficiency.

If the cosecant of $\alpha$ is maintained equal to the ratio of $d$ to $\lambda$, the +1 diffraction order will emerge normal to the plane of diffraction grating 104. However, this is not essential. An increase in diffraction efficiencies, with respect to coarse gratings, results so long as $\alpha$ has some value greater than 30° and the ratio of $\theta$ to $\lambda$ is between 1 and 2.

What is claimed is:

1. A method for increasing the optical diffraction efficiency with which a focused-image hologram consisting of a sinusoidal spatial carrier diffraction grating amplitude-modulated by a focused image of a given scene may be read out with light energy having a given intensity and including a given wavelength to reconstruct a brighter image of said given scene, said method comprising the steps of:
   a. employing as said diffraction grating a sinusoidal diffraction grating lying in a given plane and exhibiting a given line spacing in which the ratio of said given line spacing to said given wavelength is greater than one and less than two, and
   b. illuminating said focused image hologram diffraction grating with a collimated beam of said incident light energy which is inclined at a given angle larger than 30° with respect to the normal to said given plane.

2. The method defined in claim 1, wherein said given angle is substantially equal to the cosecant of said ratio of said given line spacing to said given wavelength.

* * * * *